US007129955B2

(12) United States Patent
Motomura

(10) Patent No.: US 7,129,955 B2
(45) Date of Patent: Oct. 31, 2006

(54) IMAGE DISPLAYING METHOD AND IMAGE DISPLAYING DEVICE

(75) Inventor: Hideto Motomura, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 457 days.

(21) Appl. No.: 10/474,462

(22) PCT Filed: Oct. 23, 2002

(86) PCT No.: PCT/JP02/10991

§ 371 (c)(1),
(2), (4) Date: Oct. 8, 2003

(87) PCT Pub. No.: WO03/036610

PCT Pub. Date: May 1, 2003

(65) Prior Publication Data

US 2004/0113876 A1    Jun. 17, 2004

(30) Foreign Application Priority Data

Oct. 23, 2001   (JP)   ............................. 2001-324737
Oct. 15, 2002   (JP)   ............................. 2002-300121

(51) Int. Cl.
  *G09G 5/02*   (2006.01)
(52) U.S. Cl. .................. 345/589; 345/597; 345/598; 345/599; 345/603
(58) Field of Classification Search ............... 345/589, 345/597, 598, 599, 603
See application file for complete search history.

(56) References Cited

FOREIGN PATENT DOCUMENTS

| JP | 08-248410 A | 9/1996 |
| JP | 2000-250001 A | 9/2000 |
| JP | 2000-338950 A | 12/2000 |
| JP | 2001-188309 A | 7/2001 |
| JP | 2001-306023 A | 11/2001 |
| WO | WO 97/42770 A1 | 11/1997 |

OTHER PUBLICATIONS

Japanese International Search Report for PCT/JP02/10991, dated Feb. 4, 2003.
Ryoichi Yajima, "Koshokuiki TV System", NHK Giken Dayori, Oct. 1, 1995, No. 69, pp. 8-13 (with partial English translation).
Hakutestu Ko, "Color Management no Doko", Eizo Media Gakkaishi, Jun. 20, 1998, vol. 52, No. 6, pp. 806-811 (with partial English translation).

*Primary Examiner*—Kee M. Tung
*Assistant Examiner*—Mike Rahmjoo
(74) *Attorney, Agent, or Firm*—RatnerPrestia

(57) ABSTRACT

When displaying an image with at least four primary colors mixed, there are provided a primary color B generating unit (1036) having, as an xy chromaticity, (x, y)=(0.150, 0.060) and generating a primary color B lowest in luminance, a primary color G generating unit (1038) having, as an xy chromaticity, (x, y)=(0.300, 0.600) and generating a primary color G highest in luminance, and a primary color R generating unit (1037) having, as an xy chromaticity, (x, y)=(0.640, 0.330) and generating a primary color R higher in luminance than the primary color B and lower in luminance than the primary color G, whereby it is possible to expand a color gamut while ensuring compatibility with 3-primary-color image signal by allowing three primary colors to agree with the primary color Rec. 709 of a standard display sRGB.

44 Claims, 11 Drawing Sheets

IMAGE DISPLAYING METHOD AND IMAGE DISPLAYING DEVICE

This application is a U.S. National Phase application of PCT International Application PCT/JP02/10991.

TECHNICAL FIELD

The present invention relates to image display methods for computer displays and image display devices receiving TV broadcasts using four or more primary colors, and image display devices using these methods.

BACKGROUND ART

Cross-media systems, in which a variety of image apparatuses are connected to an open system, are becoming very popular in response to advances in digital image apparatuses and network technology centering on the Internet. In open systems, image apparatuses and applications need to have a common interface and establish a configuration with high versatility and extendibility. From the aspect of color reproduction, an image apparatus sending color information, i.e., a camera or scanner, needs to send accurate color information captured to the open system. On the other hand, an image apparatus receiving and displaying color information, i.e., a display or printer, needs to display accurately the color information received. For example, even though the camera captures accurate color information, the color reproducibility of the entire system is degraded if the display can only display color information inappropriately.

To solve the above point, the IEC (International Electrotechnical Commission) has established a standard, sRGB, for standard displays. This standard clearly defines the relation between RGB video signals and colorimetric values by matching the chromaticity point of the three RGB primary colors to the colorimetric parameter defined in Rec. 709 as recommended by ITU-R (International Telecommunication Union Radio Communication). Accordingly, displays complying with this standard-display standard can calorimetrically display the same colors if the same RGB video signals are given. On the other hand, displays are often used for video editing as well as viewing the images displayed. For example, displays are used for creating originals for catalog prints. Therefore, "sRGB display," the standard display, which allows colorimetrical control, is a key to color management including hard copying such as printing.

However, the above conventional image display device has the following disadvantages. "Pointer color gamut" and "SOCS color gamut" are databases that contain the color distribution of typical reflective objects in the natural world. These databases give a dynamic range of colorimetric value input to cameras, and also provide design references for the color gamut of displays. In other words, the color gamut covering at least the sum of "Pointer color gamut" and "SOCS color gamut" [hereafter (Pointer+SOCS) gamut] is required for accurately displaying the colors of naturally reflective objects.

FIG. 3A is a sectional view of a gamut solid in the CIELAB space and shows the relation between the color gamut of the sRGB display and the (Pointer+SOCS) color gamut, which is the database for color distribution of naturally reflective objects, on the plane a*-b* at equal luminance L*=50. It is apparent from FIG. 3 that color gamut 2001 of the sRGB display is smaller than color gamut 2002 of (Pointer+SOCS), indicating that the sRGB display cannot display certain naturally reflective objects. Calculation of gamut volume in the CIELAB space reveals that the sRGB display covers about 76% of the (Pointer+SOCS) color gamut, and thus 24% of the (Pointer+SOCS) color gamut is not displayable on the sRGB display. Accordingly, even though the camera captures a precise image securing a wide dynamic range covering the color distribution of a naturally reflective object, about 24% of the precisely captured image is not displayable on the sRGB display.

A conventional image device solving this disadvantage is disclosed, for example, in the Japanese Patent Laid-open Application No. 2001-306023. FIG. 10 shows the conventional image display device disclosed in this laid-open patent.

In FIG. 10, the image display device configures multiple pixels 36 aligned in a matrix. These pixels consists of sub-pixel 36R for red light, sub-pixel 36G for green light, sub-pixel 36B for blue light, and sub-pixel 36C emitting light of cyan, magenta, or yellow. This sub-pixel 36C is specified as a point on the chromaticity diagram outside of a triangular region formed by linking points of red (R), green (G), and blue (B) on the chromaticity diagram shown in FIG. 11. The CMY in FIG. 11 indicates cyan (C), magenta (M), and yellow (Y).

In the above conventional configuration, however, a color display range changes with luminance because no restriction on luminance is provided. This makes it difficult to secure compatibility with the sRGB display when the fourth primary color is added.

More specifically, the shape and size of the color gamut of the display are determined by the positions of the primary color points. Since the color space is three-dimensional, primary color points have three-dimensional coordinates. In the case of the sRGB display, each primary color R (primary color red), primary color G (primary color green), and primary color B (primary color blue) possesses two-dimensional chromaticity coordinates (x, y) and one-dimensional luminance Y The (Pointer+SOCS) color gamut is also a three-dimensional solid. In order to display the precise colors of naturally reflective objects, two-dimensional chromaticity coordinates and one-dimensional luminance of primary colors of the display need to be determined such that the color gamut solid of the display covers the (Pointer+SOCS) color gamut solid to the maximum extent possible.

DISCLOSURE OF INVENTION

One object of the present invention is to offer an image display device that has compatibility with existing sRGB displays but has a broader color gamut.

An image display method of the present invention involves an image display method employing lights of four or more primary colors. The xy chromaticity and luminance ratio of primary color R, primary color G, and primary color B are the same as those of the sRGB display. Images are displayed by mixing these three primary color lights and a fourth primary color light. The fourth primary color light is in the visible region on the xy chromaticity diagram, possesses xy chromaticity outside the triangular region formed by primary color R, primary color G, and primary color B; and has luminance lower than that of primary color G. This makes it possible to maintain compatibility with the sRGB display, and also to broaden the color gamut.

Moreover, the image display method of the present invention employing lights of four or more primary colors is characterized as follows. The light of primary color B has the xy chromaticity of (x, y)=(0.150, 0.060) and the lowest luminance. The light of primary color G has the xy chromaticity of (x, y)=(0.300, 0.600) and the highest luminance. The light of primary color R has the xy chromaticity of (x, y)=(0.640, 0.330) and luminance higher than primary color B and lower than primary color G. The light of the fourth primary color has the xy chromaticity in a visible region on the xy chromaticity diagram but out of the triangular region formed by primary color R, primary color G, and primary color B, and luminance lower than primary color G. The image display method of the present invention displays images by mixing at least these three primary color lights and the fourth primary color light. This makes it possible to secure compatibility with the sRGB display, and also to broaden the color gamut.

The fourth primary color in the image display method of the present invention has the xy chromaticity in the visible region between the half-line extending from primary color R to primary color G and the half-line extending from the primary color R to primary color B, and has the xy chromaticity but outside of the triangular region. This allows the color gamut to be broadened most efficiently when only one primary color is added.

Moreover, in the image display method of the present invention, the fourth primary color has the xy chromaticity of (x, y)=(0.046, 0.535). In addition, when luminance of primary color R, primary color G, primary color B, and the fourth primary color are normalized to 100, luminance of primary color B is 6.78, luminance of primary color G is 56.25, luminance of primary color R is 25.25, and luminance of the fourth primary color is 11.72. This allows to maintain compatibility with the sRGB display, and also to broaden the color gamut in green and blue regions.

The image display method of the present invention employs the spatial additive mixture, superimposed additive mixture, or temporal additive mixture. In the spatial additive mixture, a pixel is configured by spatially adjoining four or more primary colors for mixing colors. In the superimposed additive mixture, a pixel is configured by spatially superimposing four or more primary colors at the same position for mixing colors. In the temporal additive mixture, a pixel is configured by temporally dividing four or more primary colors and displaying them for mixing colors.

The image display device of the present invention generates four or more primary colors, and includes an primary color R generating unit, primary color G generating unit, primary color B generating unit, fourth primary color generating unit, spatial modulation unit, and video light mixer. The primary color R generating unit, primary color G generating unit, and primary color B generating units generate lights of three primary colors with the xy chromaticity and luminance ratio same as those of the sRGB display for primary color R, primary color G, and primary color B. The fourth primary color generating unit generates light of the fourth primary color with the xy chromaticity in the visible region on the xy chromaticity diagram but outside of the triangular region formed by primary color R, primary color G, and primary color B, and luminance lower than primary color G. The spatial modulation unit provided for each primary color modulates each primary color light from the generating units using input video signals for each primary color. The video light mixer mixes video lights from the spatial modulation unit. This allows to maintain compatibility with the sRGB display, and also to broaden the color gamut.

Still more, the image display device of the present invention generates four or more primary colors, and includes the primary color B generating unit, primary color G generating unit, primary color R generating unit, fourth primary color generating unit, spatial modulation unit and video light mixer. The primary color B generating unit generates light of primary color B with the xy chromaticity of (x, y)=(0.150, 0.060) and the lowest luminance. The primary color G generating unit generates light of primary color G with the xy chromaticity of (x, y)=(0.300 0.600) and the highest luminance, and the primary color R generating unit generates light of primary color R with the xy chromaticity of (x, y)=(0.640, 0.330) and luminance higher than primary color B and lower than primary color G. The fourth primary color generating unit generates light of the fourth primary color with the xy chromaticity in the visible region on the xy chromaticity diagram but outside of the triangular region formed by primary color R, primary color G, and primary color B, and luminance lower than primary color G. The spatial modulation unit modulates primary color lights input from these generating units using video signals for each primary color. The video light mixer mixes video lights from the spatial modulation unit. This allows to maintain compatibility with the sRGB display, and also to broaden the color gamut.

The fourth primary color generating unit in the image display device of the present invention generates the light having the xy chromaticity between the half line extending from primary color R to primary color G and the half line extending from primary color R and primary color B in the visible region on the xy chromaticity diagram but outside of the triangular region. This enables to broaden the color gamut most effectively when only one primary color is added. The light generated in the fourth primary color generating unit in the image display device of the present invention has the xy chromaticity of (x, y)=(0.046, 0.535). In addition, when luminance of lights generated in the primary color R generating unit, primary color G generating unit, primary color B generating unit, and fourth primary color generating unit are normalized to 100, luminance of primary color B is 6.78, primary color G is 56.25, primary color R is 25.25, and the fourth primary color is 11.72. This allows to maintain compatibility with the sRGB display and also to broaden the color gamut in the green and blue regions.

The image light mixer in the image display device of the present invention executes the spatial additive mixture, superimposed additive mixture, or temporal additive mixture. In the spatial additive mixture, a pixel is configured by spatially adjoining four or more primary colors for mixing colors. In the superimposed additive mixture, a pixel is configured by spatially superimposing four or more primary colors at the same position for mixing colors. In the temporal additive mixture, a pixel is configured by temporally dividing four or more primary colors and displaying them for mixing colors.

The primary color generating units in the image display device of the present invention employs a dichroic mirror for spectrally reflecting a part of the light from the light source, and transmitting remaining light so as to generate light of each primary color. This allows generation of multiple primary colors based on light from the light source.

Still more, the primary color generating units in the image display device of the present invention employs a filter for spectrally absorbing a part of the light from the light source and transmitting remaining light so as to generate light of each primary color. This allows generation of multiple primary colors based on light from the light source.

The image display device of the present invention includes a light source directly or indirectly emitting the light, liquid crystal panel for modulating the light from the light source using input video signals, and a color filter panel. The color filter panel outputs light of each primary color modulated using spectral transmittance to achieve the next xy chromaticity coordinates: (x, y)=(0.150, 0.060) for primary color B, (x, y)=(0.300, 0.600) for primary color G, (x, y)=(0.640, 0.330) for primary color R, and (x, y)=(0.046, 0.535) for the fourth primary color. This allows to maintain compatibility with the sRGB display and also to broaden the color gamut.

The image display device of the present invention further includes a scaling circuit for scaling three-primary video signals for the sRGB display. When the fourth primary color video signal is not input, the signal from this scaling circuit is output to the spatial modulation unit. Accordingly, conversion with the sRGB display is simply done by scaling, facilitating the manufacture of a display specifying the chromaticity and luminance of four primary colors.

As described above, the present invention offers an image display device which maintains compatibility with existing sRGB displays and has a broader color gamut three-dimensionally by employing four or more primary colors.

DETAILED DESCRIPTION OF PREFERRED EMBODIMENT(S)

Exemplary embodiments of the present invention are described below with reference to the drawings.

The exemplary embodiments use primary color C (cyan primary color) as the fourth primary color in the description.

First Exemplary Embodiment

Figure 1:
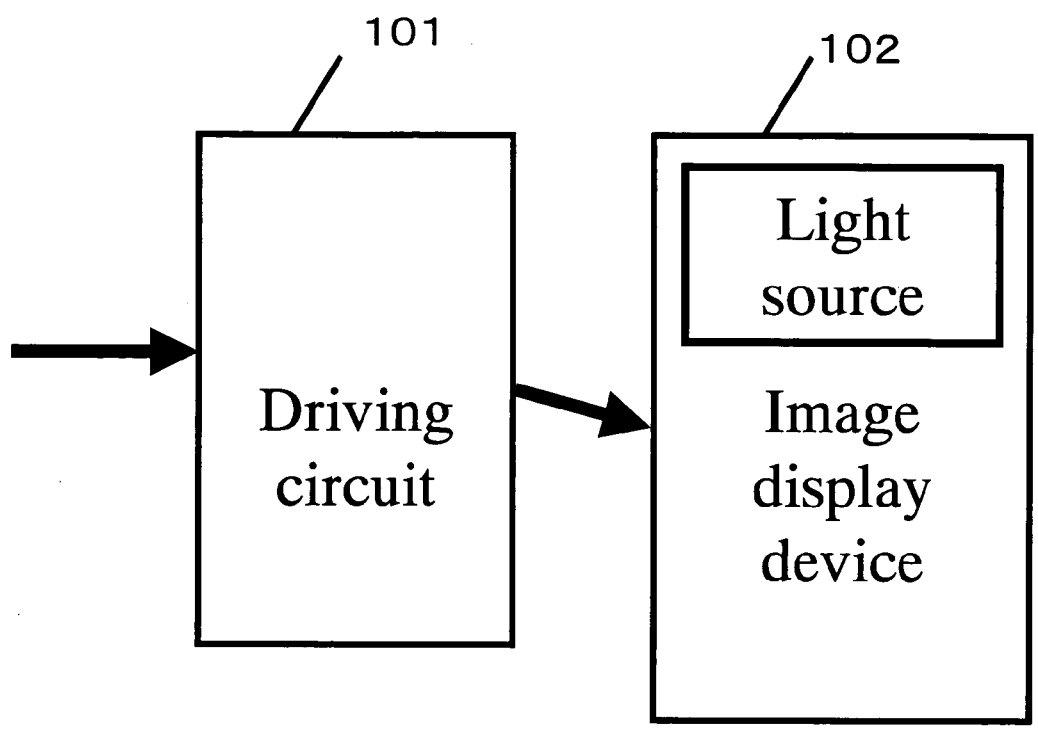
FIG. 1 is a configuration of an image display system in accordance with a first exemplary embodiment of the present invention.

FIG. 1 shows a configuration of an image display system in a first exemplary embodiment of the present invention.

In FIG. 1, driving circuit 101 is a circuit for generating a modulation element driving signal for displaying images when a video input signal is input. Image display device 102 creates all the RGBC primary color lights from light source 103, and supplies them to spatial modulation elements respectively, and video lights modulated by the modulation element driving signal are synthesized and then output for display.

Figure 2:
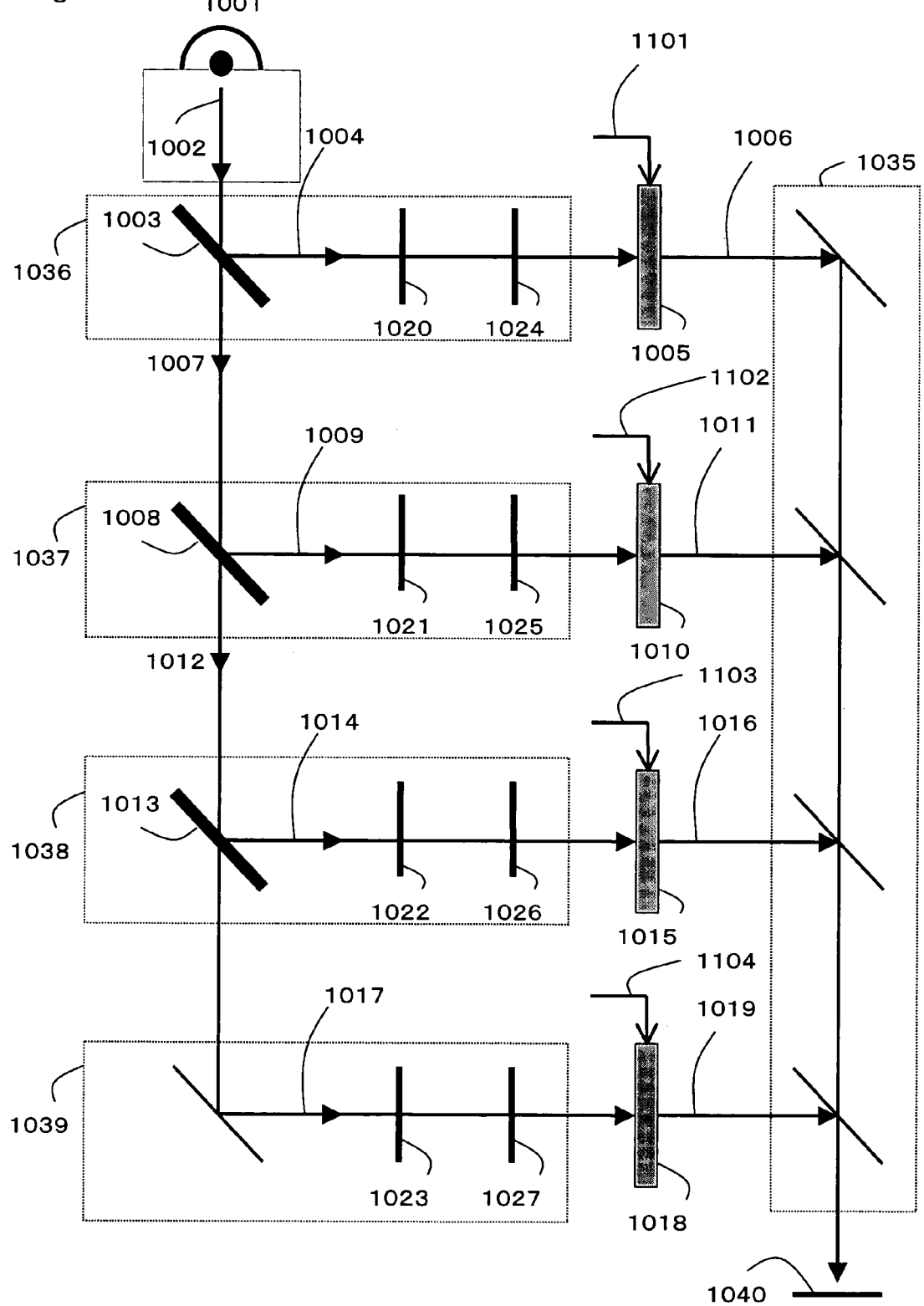
FIG. 2 is a configuration of a 4-primary color image display device in accordance with the first exemplary embodiment of the present invention.

FIG. 2 is an example of the configuration of an image display device having four primary colors (hereafter referred to as a "4-primary color display").

Light 1002 from light source 1001 enters first dichroic mirror 1003 in primary color B generating unit 1036, and the short wavelength components are reflected here so as to generate B-primary color light 1004. B-primary color light 1004 is generated in a way such that its xy chromaticity becomes (x, y)=(0.150, 0.060). If the xy chromaticity cannot be adjusted simply by the reflection characteristics of first dichroic mirror 1003, B-primary color adjustment filter 1020 is used for adjusting its spectral characteristics.

B-primary color light 1004 then enters B-primary color spatial modulation element 1005 controlled by B-primary color video signal 1101, and video tone information is added so as to modulate to B-channel video light 1006.

Light 1007 passing through first dichroic mirror 1003 enters second dichroic mirror 1008 in primary color R generating unit 1037, and long wavelength components are reflected here so as to generate R-primary color light 1009. R-primary color light 1009 is generated in a way such that its xy chromaticity becomes (x, y)=(0.300, 0.600). If the xy chromaticity cannot be adjusted simply by the reflection characteristics of second dichroic mirror 1008, R-primary color adjustment filter 1021 is used for adjusting its spectral characteristics.

R-primary color light 1009 then enters R-primary color spatial modulation element 1010 controlled by R-primary color video signal 1102, and video tone information is added so as to modulate to R-channel video light 1011.

Light 1012 passing through second dichroic mirror 1008 enters third dichroic mirror 1013 in primary color G generating unit 1038, and the long wavelength components are reflected here so as to generate G-primary color light 1014. G-primary color light 1014 is generated in a way such that its xy chromaticity becomes (x, y)=(0.640, 0.330). If the xy chromaticity cannot be adjusted simply by the reflection characteristics of third dichroic mirror 1013, G-primary color adjustment filter 1022 is used for adjusting its spectral characteristics.

G-primary color light 1014 then enters G-primary color spatial modulation element 1015 controlled by G-primary color video signal 1103, and video tone information is added so as to modulate to G-channel video light 1016.

Light passing through third dichroic mirror 1013 enters primary color C generating unit 1039, and C-primary color light 1017 is generated. C-primary color light 1017 is generated in a way such that its xy chromaticity becomes (x, y)=(0.046, 0.535). If the xy chromaticity cannot be adjusted simply by the transmission characteristics of third dichroic mirror 1013, C-primary color adjustment filter 1023 is used for adjusting its spectral characteristics.

C-primary color light 1017 then enters C-primary color spatial modulation element 1018 controlled by C-primary color video signal 1104, and video tone information is added so as to modulate to C-channel video light 1019.

Video light mixer 1035 mixes B-channel video light 1006, R-channel video light 1011, G-channel video light 1016, and C-channel video light 1019 using reflective mirror 1030 and half-mirrors 1032 to 1034. A mixed video light is displayed on screen 1040. Colors are mixed based on spatial additive mixture, superimposed additive mixture, or temporal additive mixture. In these processes, colors are mixed by composing a pixel by spatially adjoining four or more primary colors, spatially superimposing the positions of four or more primary colors, or temporally dividing four or more primary colors for display.

B-primary color ND filter 1024, R-primary color ND filter 1025, G-primary color ND filter 1026, and C-primary color ND filter 1027 adjust only the light intensity of lights emitted from B-primary color adjustment filter 1020, R-primary color adjustment filter 1021, G-primary color adjustment filter 1022, and C-primary color adjustment filter 1023 without changing their spectral characteristics. Through this adjustment, the luminance of the lights emitted from each ND filter is adjusted to the following values when the sum of luminance of lights emitted from ND filters is 100: 6.78 for the light emitted from B-primary color ND filter 1024, 25.25 for the light emitted from R-primary color ND filter 1025, 56.25 for the light emitted from G-primary color ND filter 1026, and 11.72 for the light emitted from C-primary color ND filter 1027.

B-primary color spatial modulation element 1005, R-primary color spatial modulation element 1010, G-primary color spatial modulation element 1015, and C-primary color spatial modulation element 1018 are equivalent to the spatial modulation unit.

B-primary color video signal 1101, R-primary color video signal 1102, G-primary color video signal 1103, and C-primary color video signal 1104 are equivalent to the modulation element driving signal shown in FIG. 1.

Figure 3A:
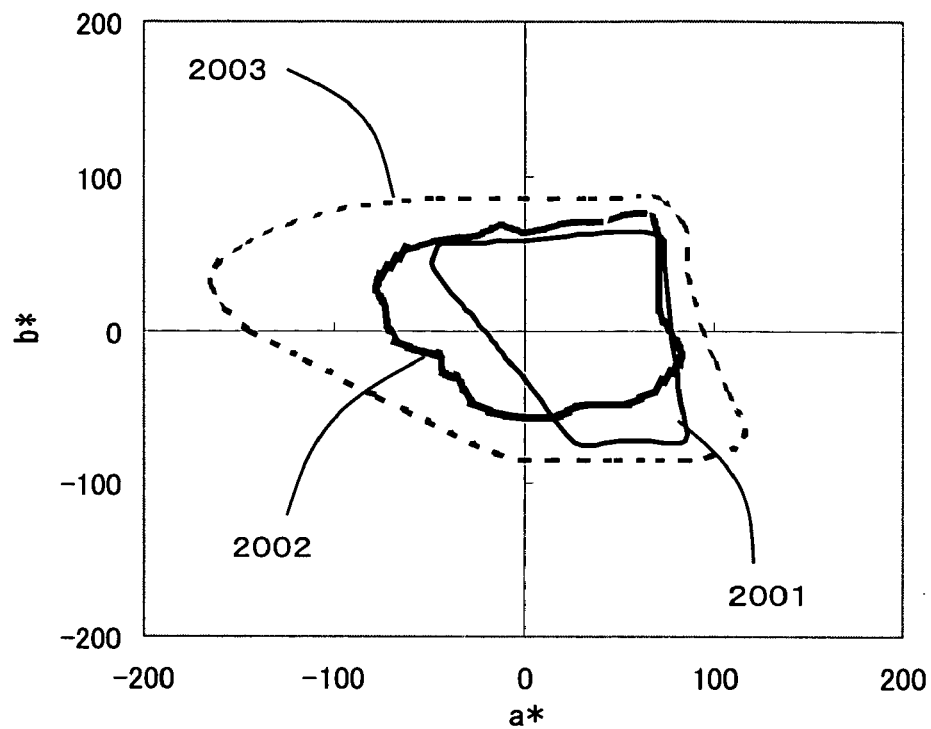
FIG. 3A is a sectional view of a color gamut in the CIELAB space typically of a conventional sRGB display
Figure 3B:
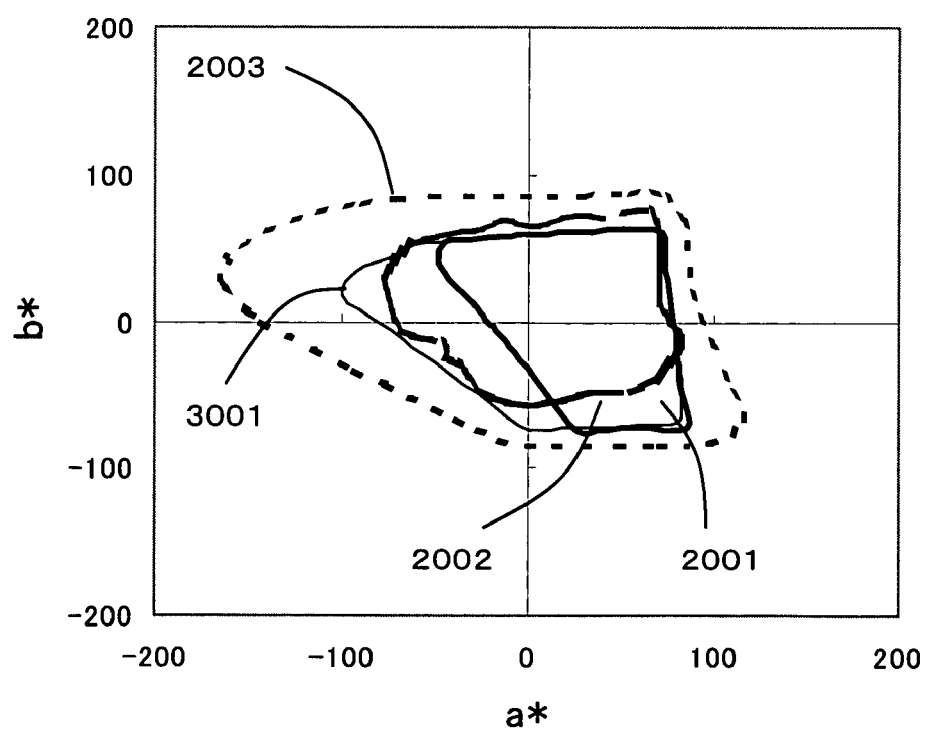
FIG. 3B is a sectional view of a color gamut in the CIELAB space typically of the 4-primary color display in accordance with the first exemplary embodiment of the present invention.

FIG. 3B is a sectional view illustrating a color gamut in the CIELAB space of the 4-primary color display in the first exemplary embodiment. The color gamut is cut by a uniform plane at $L^*=50$ in CIELAB space. It can be noted that color gamut 2001 of the sRGB display is a part of color gamut 3001 of the 4-primary color display. This happens because B-primary color light 1004, R-primary color light 1009, and G-primary color light 1014 conform to the RGB primary colors of the sRGB display.

The 4-primary color display in FIG. 2 further has C-primary color light 1017 as the fourth primary color. It can be noted that the color gamut spreads widely over a region from green to blue by setting the xy chromaticity point of this color to (x, y)=(0.046, 0.535). When color gamut 3001 of the 4-primary color display is compared with color gamut 2002 of the (Pointer+SOCS) color gamut, which is the color distribution database for naturally reflective objects, (Pointer+SOCS) color gamut 2002 is completely covered in the green and blue region which cannot be covered by the sRGB display, but (Pointer+SOCs) color gamut 2002 is broader in part of the orange to yellow region. Therefore, it can be understood that the 4-primary color display mostly covers color gamut 2002 of (pointer+SOCS) color gamut and also color gamut 2001 of the sRGB display.

Next, colors are projected on a chromaticity diagram, ignoring brightness information, for identifying the entire color gamut.

Figure 4:
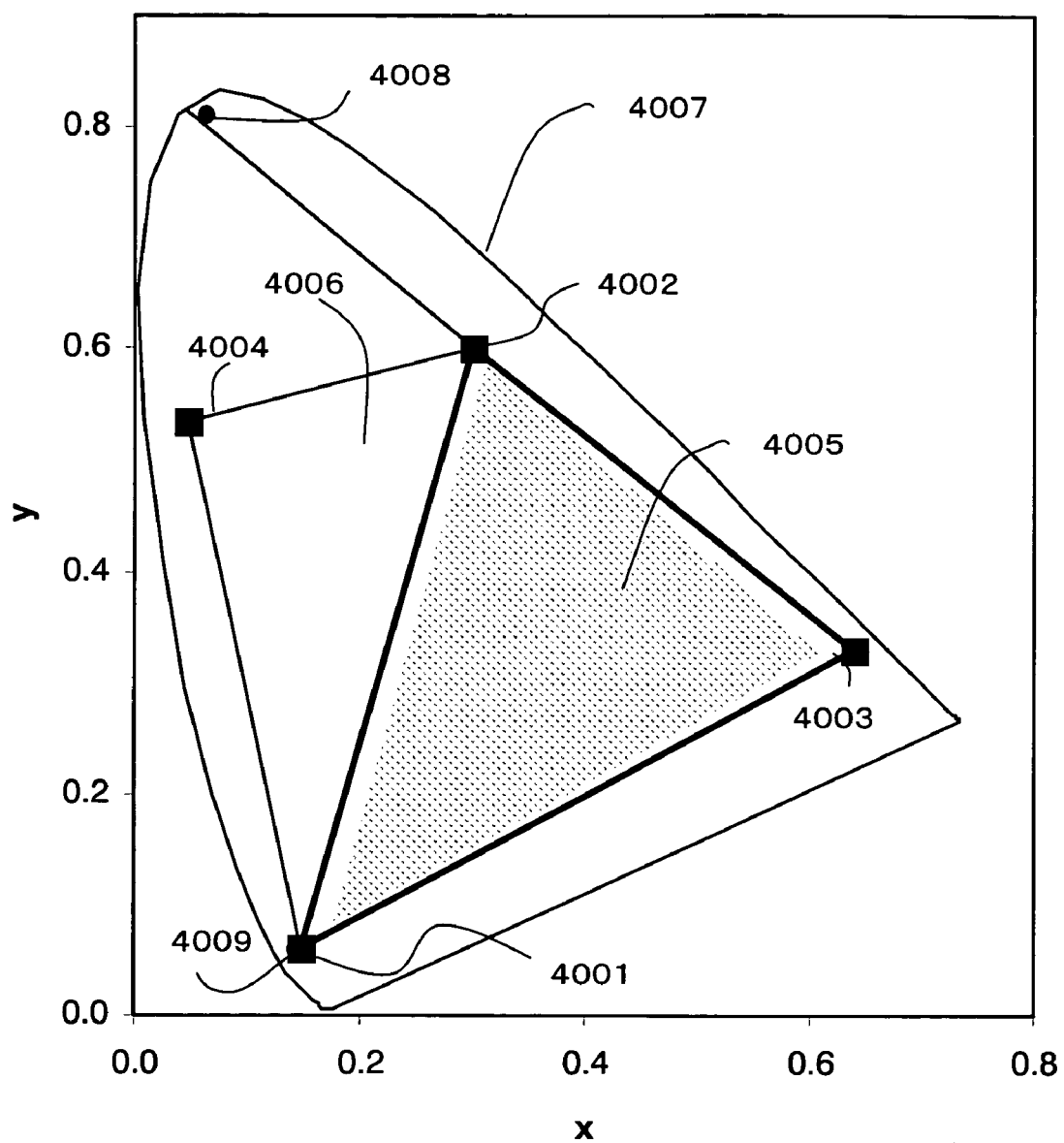
FIG. 4 is a chromaticity diagram indicating the color gamut of the sRGB display and the color gamut of the 4-primary color display in accordance with the first exemplary embodiment of the present invention.

FIG. 4 is an xy chromaticity diagram for the 4-primary color display in the first exemplary embodiment.

In FIG. 4, horseshoe shape 4007 is the visible region, and B-primary color 4001 is (x, y)=(0.150, 0.060), G-primary color 4002 is (x, y)=(0.300, 0.600), R-primary color 4003 is (x, y)=(0.640, 0.330), and C-primary color 4004 is (x, y)=(0.046, 0.535). Accordingly, B-primary color 4001, G-primary color 4002, and R-primary color 4003 conform to Rec. 709, and triangle 4005 formed by these colors is the color gamut of the sRGB display. Triangle 4006 formed by C-primary color 4004, B-primary color 4001, and G-primary color 4002 is the color gamut extended by introducing the fourth primary color C. In other words, the display range has broadened for colors given names such as blue, blue-green, and green. In particular, the color gamut can be extended most efficiently by selecting the fourth primary color in an area surround by four points that are crossing point 4008 of the extended-line from R-primary color 4003 to G-primary color 4002 and horseshoe shape 4007, crossing point 4009 of the half-line from R-primary color 4003 to B-primary color 4001 and horseshoe shape 4007, B-primary color 4001, and G-primary color 4002.

The color gamut formed by four primary colors: B-primary color 4001, G-primary color 4002, R-primary color 4003, and C-primary color 4004 covers 95% of the (Pointer+SOCS) color gamut for naturally reflective objects. The coverage by color gamut 4005 of the sRGB display is 76%. It is apparent that introduction of C-primary color 4004 has significantly broadened the color gamut of the 4-primary color display.

The color distribution of naturally reflective objects and the coverage of the color gamut of the 4-primary color display are described below.

Pointer gamut data base (Color Research and Application) and SOCS gamut database (ISO) are valid for the color distribution of naturally reflective objects. The Pointer gamut database gives CIELAB values or CIELUV values using standard light C as a reference white color. The SOCS gamut database gives spectral reflectance factors. Values in the SOCS gamut database are combined with values in the Pointer gamut database, and they are converted to CIELAB values. Naturally reflective objects are distributed in a closed region including the achromatic color axis. Accordingly, if the color gamut of the display can cover this closed region, any color of naturally reflective objects can be reproduced on the display.

Figure 5:
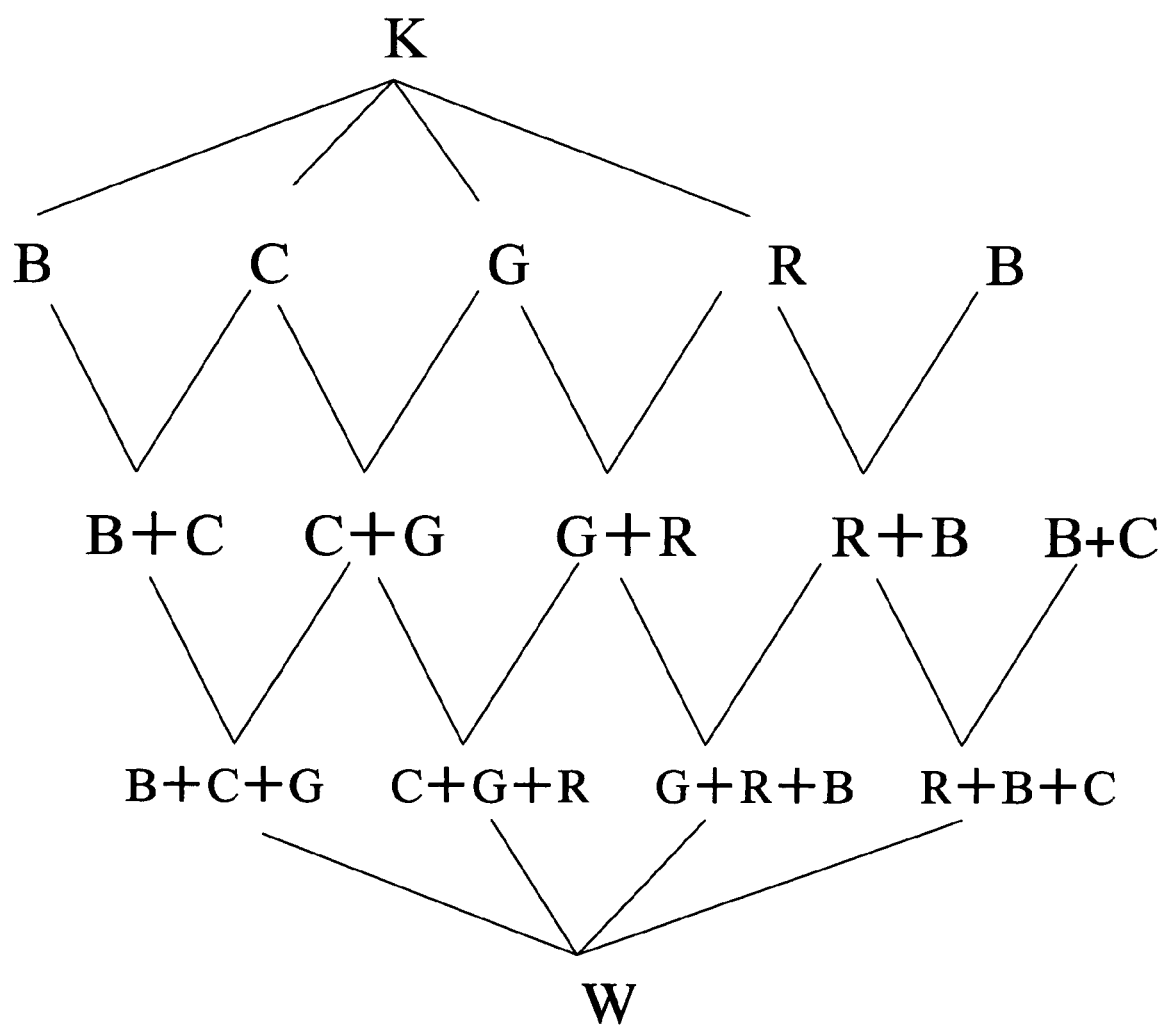
FIG. 5 illustrates the relation among primary colors, secondary colors, tertiary colors, black, and white in accordance with the first exemplary embodiment of the present invention.

The color gamut of the display can be defined based on the tristimulus value XYZ of four primary colors. More specifically, the color gamut of the display is a solid formed by 14 points consisting of four primary colors (B, C, G, and R) called primary colors, colors made by adding primary colors (B+C, C+G, G+R, R+B) called secondary colors, colors made by adding secondary colors (B+C+G, C+G+R, G+R+B, R+B+C) called tertiary colors, and black and white (W=B+C+G+R) as shown in FIG. 5. The coverage relation of the above two color gamuts can be identified by cutting this solid of the display color gamut along the L*uniform plane, as shown in FIG. 3B, and comparing with the color distribution of naturally reflective objects.

The relation between the xy chromaticity and XYZ tristimulus value is expressed by Equation 1.

$$\begin{bmatrix} X \\ Y \\ Z \end{bmatrix} = \begin{bmatrix} \frac{x}{y}Y \\ Y \\ \frac{1-x-y}{y}Y \end{bmatrix} \quad (1)$$

Luminance Y of four primary color points is a relative value normalized to 100: 6.78 for B-primary color, 56.25 for G-primary color, 25.25 for R-primary color, and 11.72 for C-primary color. Accordingly, tristimulus value XYZ of four primary colors is (X, Y, Z)=(16.94, 6.78, 89.24) for B-primary color, (X, Y, Z)=(28.13, 56.25, 9.38) for G-primary color, (X, Y, Z)=(48.97, 25.25, 2.30) for R-primary color, and (X, Y, Z)=(1.00, 11.72, 9.17) for C-primary color.

Next, compatibility between the 3-primary color system and 4-primary color system is described.

By matching the chromaticity coordinates of three primary colors, i.e., primary color R, primary color G, and primary color B, out of four primary colors to Rec. 709; two advantages are achieved as follows.

The first advantage is that the display design can be simplified. In other words, three-color materials used in conventional RGB 3-primary color displays can be utilized to produce three colors in four primary colors. Since the chromaticity coordinates of primary color B, primary color G, and primary color R are the same, with only luminance Y differing, the 4-primary color display can set primary color B, primary color G, and primary color R simply by adjusting the gain using B-primary color ND filter 1024, R-primary color ND filter 1025, and G-primary color ND filter 1026 as shown in FIG. 2. If, for example, the chromaticity coordinates for primary color B, primary color G, and primary color R are set to other than the chromaticity coordinates in Rec. 709, the materials for all four primary colors would need to be re-designed for the 4-primary color display. Accordingly, the use of conventional Rec. 709 primary colors gives a broader set of advantages with respect to development period, reliability, development cost, etc.

The second advantage is the compatibility of the video interface. In the case of the 4-primary color display, four types of video signals, i.e., $R_{d4}$, $G_{d4}$, $B_{d4}$, and $C_{d4}$, are input. If xy chromaticity coordinates of primary colors corresponding to three video signals $R_{d4}$, $G_{d4}$, and $B_{d4}$ conform to Rec. 709, compatibility with video signals for the 3-primary color display is achieved by introducing a scaling circuit. In the case of the 3-primary color display, video signals $R_{d3}'$, $G_{d3}'$, and $B_{d3}'$ linear to luminance Y after CRT gamma correction are converted to display colors $[X_{d3}, Y_{d3}, Z_{d3}]^t$ on the display by Equation 2.

where $$\begin{bmatrix} X_{d3} \\ Y_{d3} \\ Z_{d3} \end{bmatrix} = \begin{bmatrix} X_{R3} & X_{G3} & X_{B3} \\ Y_{R3} & Y_{G3} & Y_{B3} \\ Z_{R3} & Z_{G3} & Z_{B3} \end{bmatrix} \begin{bmatrix} R_{d3'} \\ G_{d3'} \\ B_{d3'} \end{bmatrix} \quad (2)$$

$[X_{b3}, Y_{B3}, Z_{B3}]^t$ is tristimulus value XYZ of primary color B;

$[X_{G3}, Y_{G3}, Z_{G3}]^t$ is tristimulus value XYZ of primary color G; and $[X_{R3}, Y_{R3}, Z_{R3}]^t$ is tristimulus value XYZ of primary color R.

Equation 3 below is obtained by rewriting Equation 2 using Equation 1.

$$\begin{bmatrix} X_{d3} \\ Y_{d3} \\ Z_{d3} \end{bmatrix} = \begin{bmatrix} \frac{x_{R3}}{y_{R3}}Y_{R3} & \frac{x_{G3}}{y_{G3}}Y_{G3} & \frac{x_{B3}}{y_{B3}}Y_{B3} \\ Y_{R3} & Y_{G3} & Y_{B3} \\ \frac{1-x_{R3}-y_{R3}}{y_{R3}}Y_{R3} & \frac{1-x_{G3}-y_{G3}}{y_{G3}}Y_{G3} & \frac{1-x_{B3}-y_{B3}}{y_{B3}}Y_{B3} \end{bmatrix} \begin{bmatrix} R_{d3'} \\ G_{d3'} \\ B_{d3'} \end{bmatrix} \quad (3)$$

Where (2)

$$\begin{bmatrix} X_{d3} \\ Y_{d3} \\ Z_{d3} \end{bmatrix} = \begin{bmatrix} X_{R3} & X_{G3} & X_{B3} \\ Y_{R3} & Y_{G3} & Y_{B3} \\ Z_{R3} & Z_{G3} & Z_{B3} \end{bmatrix} \begin{bmatrix} R_{d3'} \\ G_{d3'} \\ B_{d3'} \end{bmatrix}$$

$x_{B3}, y_{B3}, z_{B3}$ are chromaticity coordinates xyz of primary color B;

$x_{G3}, y_{G3}, z_{G3}$ are chromaticity coordinates xyz of primary color G; and $x_{R3}, y_{R3}, z_{R3}$ are chromaticity coordinates xyz of primary color R.

In case of the 4-primary color display, video signals $R_{d4}'$, $G_{d4}'$, $B_{d4}'$, and $C_{d4}'$ linear to luminance Y after CRT gamma correction are converted to display colors $[X_{d4}\ Y_{d4}\ Z_{d4}]^t$ on the display by Equation 4.

$$\begin{bmatrix} X_{d4} \\ Y_{d4} \\ Z_{d4} \end{bmatrix} = \begin{bmatrix} X_{R4} & X_{G4} & X_{B4} & X_{C4} \\ Y_{R4} & Y_{G4} & Y_{B4} & Y_{C4} \\ Z_{R4} & Z_{G4} & Z_{B4} & Z_{C4} \end{bmatrix} \begin{bmatrix} R_{d4'} \\ G_{d4'} \\ B_{d4'} \\ C_{d4'} \end{bmatrix} \quad (4)$$

Where $[X_{B4}\ Y_{B4}\ Z_{B4}]^t$ is tristimulus value XYZ of primary color B;

$[X_{G4}\ Y_{G4}\ Z_{G4}]^t$ is tristimulus value XYZ of primary color G;

$[X_{R4}\ Y_{BR}\ Z_{R4}]^t$ is tristimulus value XYZ of primary color R;

$[X_{C4}\ Y_{C4}\ Z_{C4}]^t$ is tristimulus value XYZ of primary color C.

Equation 5 below is obtained by rewriting Equation 4 using Equation 1.

$$\begin{bmatrix} X_{d4} \\ Y_{d4} \\ Z_{d4} \end{bmatrix} = \quad (5)$$

$$\begin{bmatrix} \frac{x_{R4}}{y_{R4}}Y_{R4} & \frac{x_{G4}}{y_{G3}}Y_{G4} & \frac{x_{B4}}{y_{B4}}Y_{B4} & \frac{x_{C4}}{y_{C4}}Y_{C4} \\ Y_{R4} & Y_{G4} & Y_{B4} & Y_{C4} \\ \frac{1-x_{R4}-y_{R4}}{y_{R4}}Y_{R4} & \frac{1-x_{G4}-y_{G4}}{y_{G4}}Y_{G4} & \frac{1-x_{B4}-y_{B4}}{y_{B4}}Y_{B4} & \frac{1-x_{C4}-y_{C4}}{y_{C4}}Y_{C4} \end{bmatrix}$$

$$\begin{bmatrix} R_{d4'} \\ G_{d4'} \\ B_{d4'} \\ C_{d4'} \end{bmatrix}$$

Where, $x_{B4}, y_{B4}, z_{B4}$ are chromaticity coordinates xyz of primary color B;

$x_{G4}, y_{G4}, z_{G4}$ are chromaticity coordinates xyz of primary color G;

$x_{R4}, y_{R4}, z_{R4}$ are chromaticity coordinates xyz of primary color R; and $x_{C4}, y_{C4}, z_{C4}$ are chromaticity coordinates xyz of primary color C.

If the chromaticity coordinates of primary color B, primary color G, and primary color R of the 4-primary color display match those of primary color B, primary color G, and primary color R of the 3-primary color display, Equations 3 and 5 can be expressed by Equation 6 at the same time as follows.

In other words, when video signals $R_{d3}'$, $G_{d3}'$, and $B_{d3}'$ for the 3-primary color display are input, involvement of primary color to the display color is shut off by $w_c=0$. Moreover, a difference in luminance of primary color B, primary color G, and primary color R can be absorbed by $w_R$, $w_G$, and $w_B$.

Figure 6:
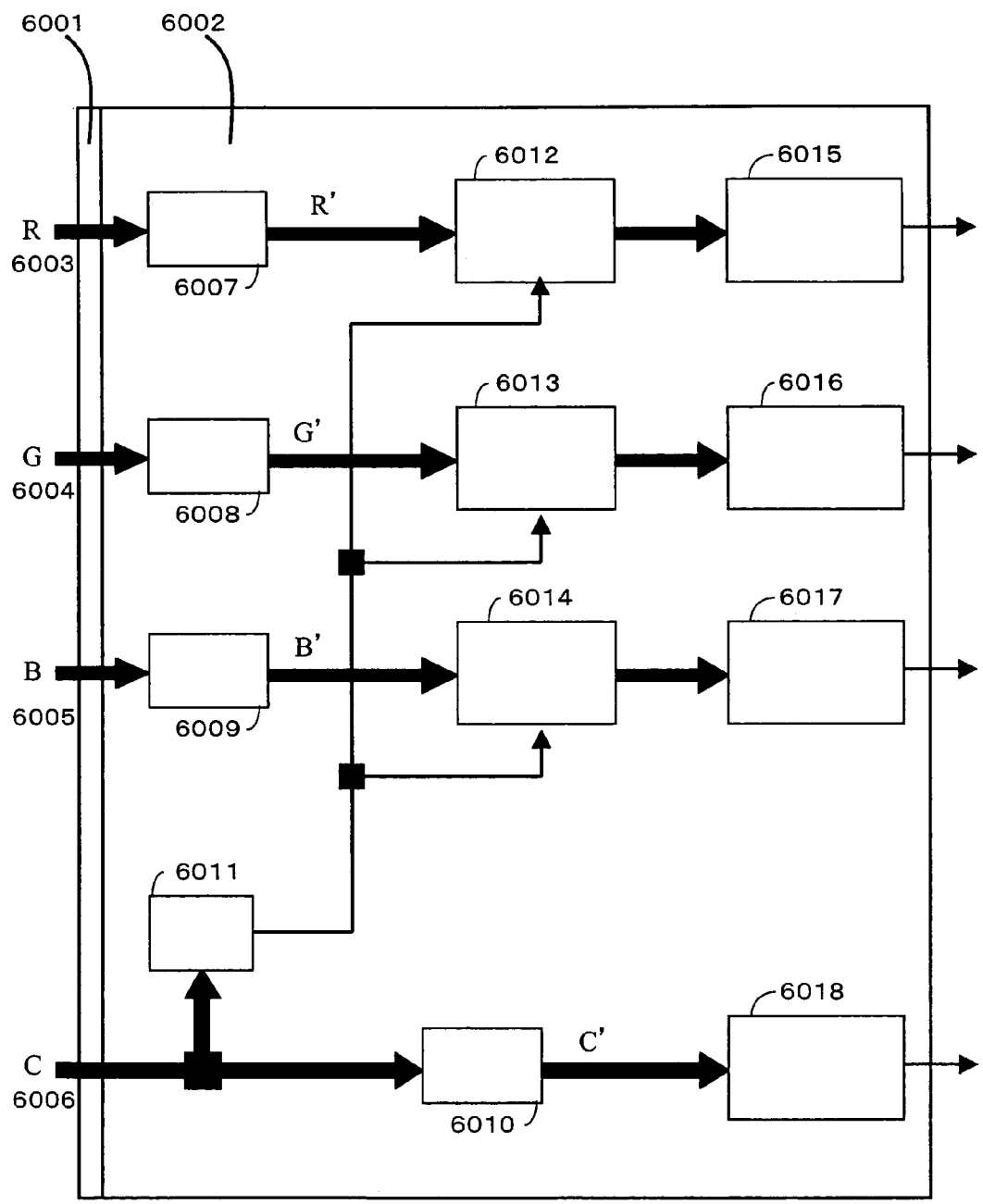
FIG. 6 is a configuration of a driving circuit of the video display system in accordance with the first exemplary embodiment of the present invention.

FIG. 6 shows the configuration of driving circuit 101 in the image display device corresponding to Equation 6.

In FIG. 6, the 4-primary color display is configured by video interface 6001 and processing circuit 6002. R-channel image signal 6003, G-channel image signal 6004, B-channel image signal 6005, and C-channel video signal 6006 are input to processing circuit 6002 from video interface 6001, and video signals are converted to luminance linear signals R', G', B', and C' in degamma circuits 6007 to 6010

(6)

$$\begin{bmatrix} X_{d4} \\ Y_{d4} \\ Z_{d4} \end{bmatrix} =$$

$$\begin{bmatrix} \frac{x_{R3}}{y_{R3}}Y_{R4} & \frac{x_{G3}}{y_{G3}}Y_{G4} & \frac{x_{B3}}{y_{B3}}Y_{B4} & \frac{x_{C4}}{y_{C4}}Y_{C4} \\ Y_{R4} & Y_{G4} & Y_{B4} & Y_{C4} \\ \frac{1-x_{R3}-y_{R3}}{y_{R3}}Y_{R4} & \frac{1-x_{G3}-y_{G3}}{y_{G3}}Y_{G4} & \frac{1-x_{B3}-y_{B3}}{y_{B3}}Y_{B4} & \frac{1-x_{C4}-y_{C4}}{y_{C4}}Y_{C4} \end{bmatrix}$$

$$\begin{bmatrix} w_R R_{d4'} \\ w_G G_{d4'} \\ w_B B_{d4'} \\ w_C C_{d4'} \end{bmatrix}$$

$$w_R = \begin{cases} \frac{Y_{R3}}{Y_{R4}} & (C_{d4'} \neq 0) \\ 1 & (C_{d4'} = 0) \end{cases}$$

$$w_G = \begin{cases} \frac{Y_{G3}}{Y_{G4}} & (C_{d4'} \neq 0) \\ 1 & (C_{d4'} = 0) \end{cases}$$

$$w_B = \begin{cases} \frac{Y_{B3}}{Y_{B4}} & (C_{d4'} \neq 0) \\ 1 & (C_{d4'} = 0) \end{cases}$$

$$w_C = \begin{cases} \frac{Y_{C3}}{Y_{C4}} & (C_{d4'} \neq 0) \\ \text{arbitrary} & (C_{d4'} = 0) \end{cases}$$

respectively for each channel. Signal C is input to C-signal detector 6011 for detecting the presence of C-channel video signal 6006. If C-channel video signal 6006 is detected (including C=0), C-signal detector 6011 gives an instruction to scaling circuits 6012 to 6014 respectively for R channel, G channel and B channel to send signal R', signal G', and signal B' respectively to spatial modulation element driving circuits 6015 to 6017 without scaling because C-channel video signal 6006 is a signal for the 4-primary color display. At the same time, signal C' is sent from C-primary color degamma circuit to C-primary color spatial modulation element driving circuit 6018 so as to display images using the mixture of four primary colors on the 4-primary color display.

If no C-channel video signal 6006 is input when RGB signals for the 3-primary color display are input to video interface 6001 as R-channel image signal 6003, G-channel image signal 6004, and B-channel image signal 6005; C-signal detector 6011 detects the absence of C-channel video signal 6006, and gives an instruction to scaling circuits 6012 to 6014 to execute scaling. In accordance with this instruction, R-primary color scaling circuit 6012 executes scaling equivalent to $w_R$ in Equation 6. In the same way, G-primary color scaling circuit 6013 executes scaling equivalent to $w_G$ in Equation 6, and B-primary color scaling circuit 6014 executes scaling equivalent to $w_B$ in Equation 6. Accordingly, signals are converted to driving signals for the 3-primary color display, and then they are sent to respective spatial modulation element driving circuits 6015 to 6017.

Since no C-channel video signal 6006 is input, no signal is input to C-primary color spatial modulation element driving circuit 6018. Accordingly, lights for C-primary color in image display device 103 are all extinguished by C-primary color spatial modulation element, and an image using a mixture of three primary colors RGB is displayed.

If chromaticity of primary colors is not specified as (x, y)=(0.150, 0.60) for primary color B, (x, y)=(0.300, 0.600) for primary color G, (x, y)=(0.640, 0.330) for primary color R, and (x, y)=(0.046, 0.535) for primary color C in the CIELAB space at L*=50 as in the prior art, and the chromaticity coordinates do not conform to Rec. 709, it is necessary to convert to R', G', and B' signals for the 4-primary color display which are colorimetrically equivalent to sRGB signals by sRGB inputs.

First, the colorimetric values $[X_{d3}\ Y_{d3}\ Z_{d3}]^t$ of display colors of sRGB signals, which are input signals, are given by Equation 3. Then, calculation is implemented using the chromaticity coordinates of RGB primary color points conforming to Rec. 709[R-primary color $(x_{R3}, y_{R3})$=(0.0640, 0.330), G-primary color $(x_{G3}, y_{G3})$=(0.300, 0.600), and B-primary color $(x_{B3}, y_{B3})$=(0.150, 0.060)] and relative luminance $(Y_{R3}\ Y_{G3}\ Y_{B3})$=(21.25, 71.54, 7.21).

Colorimetric value $[X_{d4}\ Y_{d4}\ Z_{d4}]^t$ of display colors by RGB primary colors excluding primary color C in the 4-primary color display is given by Equation 7.

$$\begin{bmatrix} X_{d4} \\ Y_{d4} \\ Z_{d4} \end{bmatrix} \quad (7)$$

-continued $$\begin{bmatrix} \frac{x_{R4}}{y_{R4}} Y_{R4} & \frac{x_{G4}}{y_{G4}} Y_{G4} & \frac{x_{B4}}{y_{B4}} Y_{B4} \\ Y_{R4} & Y_{G4} & Y_{B4} \\ \frac{1-x_{R4}-y_{R4}}{y_{R4}} Y_{R4} & \frac{1-x_{G4}-y_{G4}}{y_{G4}} Y_{G4} & \frac{1-x_{B4}-y_{B4}}{y_{B4}} Y_{B4} \end{bmatrix}$$

$$\begin{bmatrix} R_{d4'} \\ G_{d4'} \\ B_{d4'} \end{bmatrix}$$

R' G', and B' signals for the 4-primary display colorimetrically equivalent to input sRGB signals are given by Equation 8 as follows.

$$\begin{bmatrix} X_{d4} \\ Y_{d4} \\ Z_{d4} \end{bmatrix} = \begin{bmatrix} X_{d3} \\ Y_{d3} \\ Z_{d3} \end{bmatrix} \quad (8)$$

$$\Leftrightarrow \begin{bmatrix} \frac{x_{R4}}{y_{R4}} Y_{R4} & \frac{x_{G4}}{y_{G4}} Y_{G4} & \frac{x_{B4}}{y_{B4}} Y_{B4} \\ Y_{R4} & Y_{G4} & Y_{B4} \\ \frac{1-x_{R4}-y_{R4}}{y_{R4}} Y_{R4} & \frac{1-x_{G4}-y_{G4}}{y_{G4}} Y_{G4} & \frac{1-x_{B4}-y_{B4}}{y_{B4}} Y_{B4} \end{bmatrix} \begin{bmatrix} R_{d4'} \\ G_{d4'} \\ B_{d4'} \end{bmatrix}$$

$$= \begin{bmatrix} \frac{x_{R3}}{y_{R3}} Y_{R3} & \frac{x_{G3}}{y_{G3}} Y_{G3} & \frac{x_{B3}}{y_{B3}} Y_{B3} \\ Y_{R3} & Y_{G3} & Y_{B3} \\ \frac{1-x_{R3}-y_{R3}}{y_{R3}} Y_{R3} & \frac{1-x_{G3}-y_{G3}}{y_{G3}} Y_{G3} & \frac{1-x_{B3}-y_{B3}}{y_{B3}} Y_{B3} \end{bmatrix} \begin{bmatrix} R_{d3'} \\ G_{d3'} \\ B_{d3'} \end{bmatrix}$$

$$\Leftrightarrow M_{d4,RGB} \begin{bmatrix} R_{d4'} \\ G_{d4'} \\ B_{d4'} \end{bmatrix} = M_{d3} \begin{bmatrix} R_{d3'} \\ G_{d3'} \\ B_{d3'} \end{bmatrix}$$

$$\Leftrightarrow \begin{bmatrix} R_{d4'} \\ G_{d4'} \\ B_{d4'} \end{bmatrix} = M^{-1}d4, RGB M_{d3} \begin{bmatrix} R_{d3'} \\ G_{d3'} \\ B_{d3'} \end{bmatrix}$$

Figure 7:
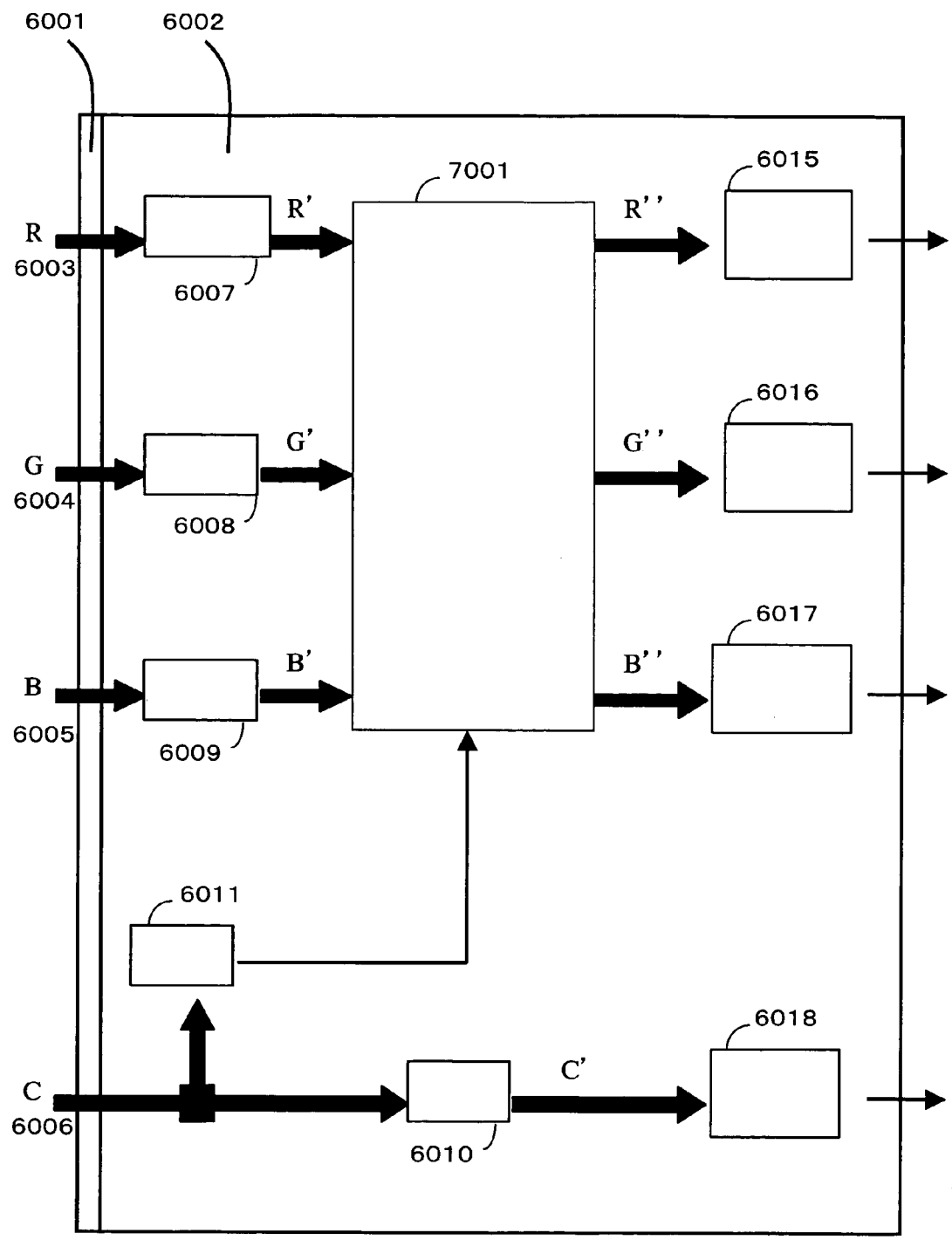
FIG. 7 is a configuration of a driving circuit using matrix calculation circuit in accordance with the first exemplary embodiment.

FIG. 7 shows the configuration of a driving circuit for the 4-primary color display when the chromaticity coordinates of primary color R, primary color G, and primary color B is not matched to Rec. 709.

A point different from the driving circuit for the 4-primary color display when the chromaticity coordinates of R-primary color, G-primary color, and B-primary color conform to Rec. 709 is that matrix calculation circuit 7001 is needed instead of the scaling circuit for each of the RGB primary colors. This matrix calculation circuit calculates 3 lines and 3 rows in matrix as shown in Equation 8. Therefore, the matrix calculation circuit is larger and more expensive than the scaling circuit.

As described above, the 4-primary color display in the first exemplary embodiment matches the chromaticity coordinates of primary color R, primary color G, and primary color B to Rec. 709, and identifies one-dimensional luminance Y. This allows the use of materials for the conventional RGB 3-primary display. In addition, the driving circuit can use a simple scaling calculation for securing compatibility with 3-primary color video signals. Accordingly, a 4-primary color display for a broad color gamut that covers most of the color distribution of naturally reflective objects is achievable.

The configuration shown in FIG. 2 is suitable for a projector, and demonstrates the capability to display an image closer to the actual image when the image is reproduced on a large screen at the size of the original.

It is apparent that the present invention does not apply restrictions to the sequence of generating each primary color. In other words, the sequence of generating each primary color can be determined as required.

Second Exemplary Embodiment

Figure 8:
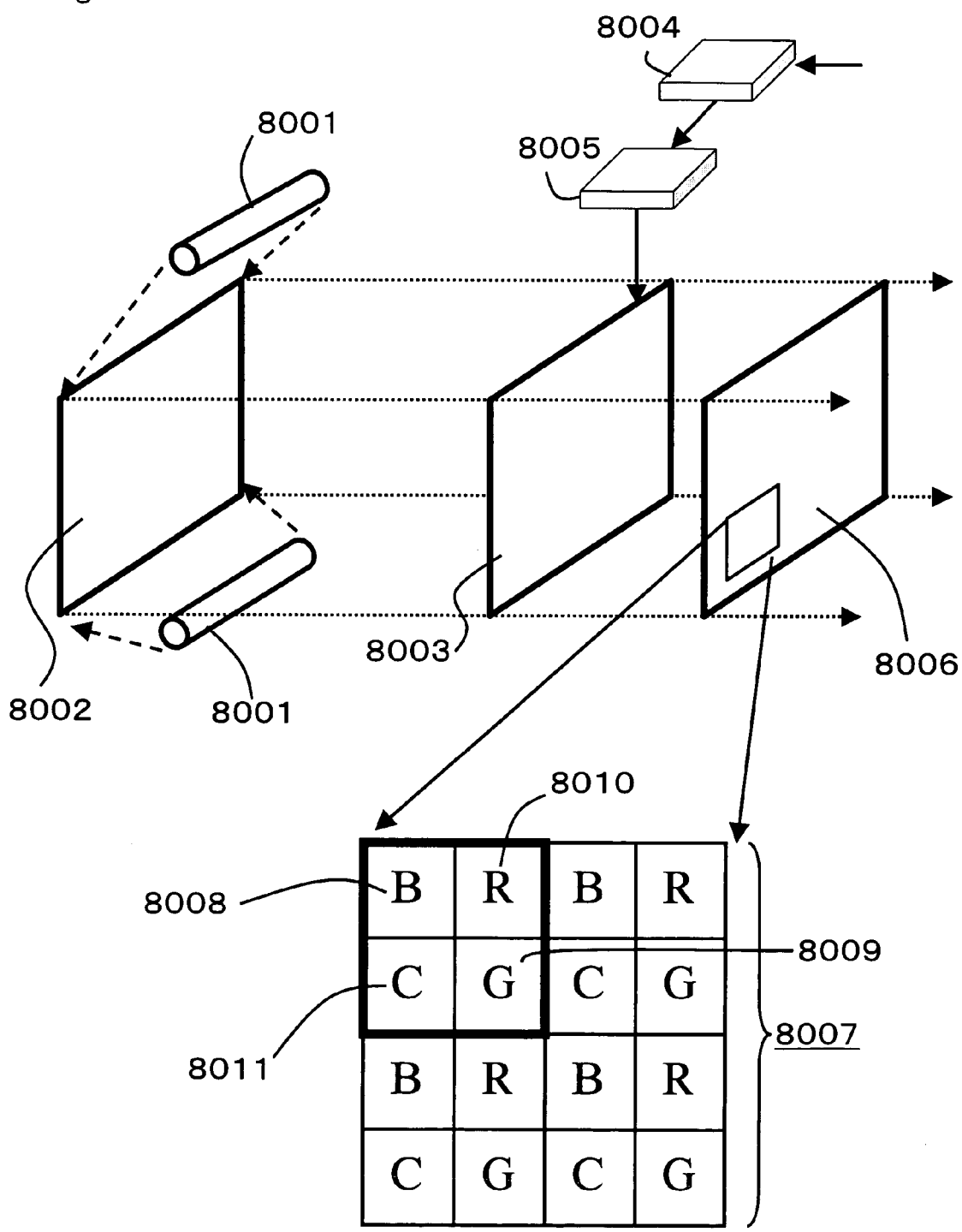
FIG. 8 is a configuration of a 4-primary color image display device in accordance with a second exemplary embodiment of the present invention.

FIG. 8 is the configuration of a 4-primary color liquid crystal display in a second exemplary embodiment of the present invention.

In FIG. 8, the light emitted from light source 8001 is reflected on reflector 8002, and enters liquid crystal panel 8003. Liquid crystal panel 8003 is demodulated by the operation of liquid crystal panel driving circuit 8005 driven by a video signal given by video memory 8004, and video tone is expressed as light intensity. The light passing through liquid crystal panel 8003 enters color filter panel 8006, and spectral energy distribution is changed and output based on the optical absorption characteristic of the colored material.

Color filter panel 8007, which is a fragmentary magnified view to show the structure of color filter panel 8006, consists of four color filters: B-filter 8008, G-filter 8009, R-filter 8010, and C-filter 8011. These four color filters are disposed in units of 2×2 cells. The video signal is sent to this 2×2 cell as one pixel. Since there are four primary colors, a "square pixel" required for the computer display is easily made feasible.

As shown in FIG. 4, the four primary colors B, G, R, and C have chromaticity coordinates identical to those in the first exemplary embodiment: (x, y)=(0.150, 0.060) for primary color B, (x, y)=(0.300, 0.600) for primary color G, (x, y)=(0.640, 0.330) for primary color R, and (x, y)=(0.046, 0.535) for primary color C. If the size of each color filter is sufficiently small beyond the limit of visible resolution, lights passing each color filter are mixed, and the color gamut combining triangle 4005 and triangle 4006 is achieved.

As described above, the liquid crystal display in the second exemplary embodiment also conforms the chromaticity coordinates of primary color R, primary color G, and primary color B to Rec. 709, as in the first exemplary embodiment, and identifies one-dimensional luminance Y. Accordingly, materials for the conventional RGB 3-primary color liquid crystal display can be used, and the driving circuit can use a simple scaling calculation for securing compatibility with 3-primary color video signals. A 4-primary color display with a broad color gamut mostly covering the color distribution of naturally reflective objects can thus be achieved.

The configuration in the second exemplary embodiment is suitable for a desktop display, and is effective in displaying video images closer to the real image for editing texts in desktop publishing (DTP).

It is noted that the present invention does not place restrictions on the spatial positions of the color filters. Positions for B-filter 8008, G-filter 8009, R-filter 8010, and C-filter 8011 in FIG. 8 are determined as required.

Third Exemplary Embodiment

Figure 9:
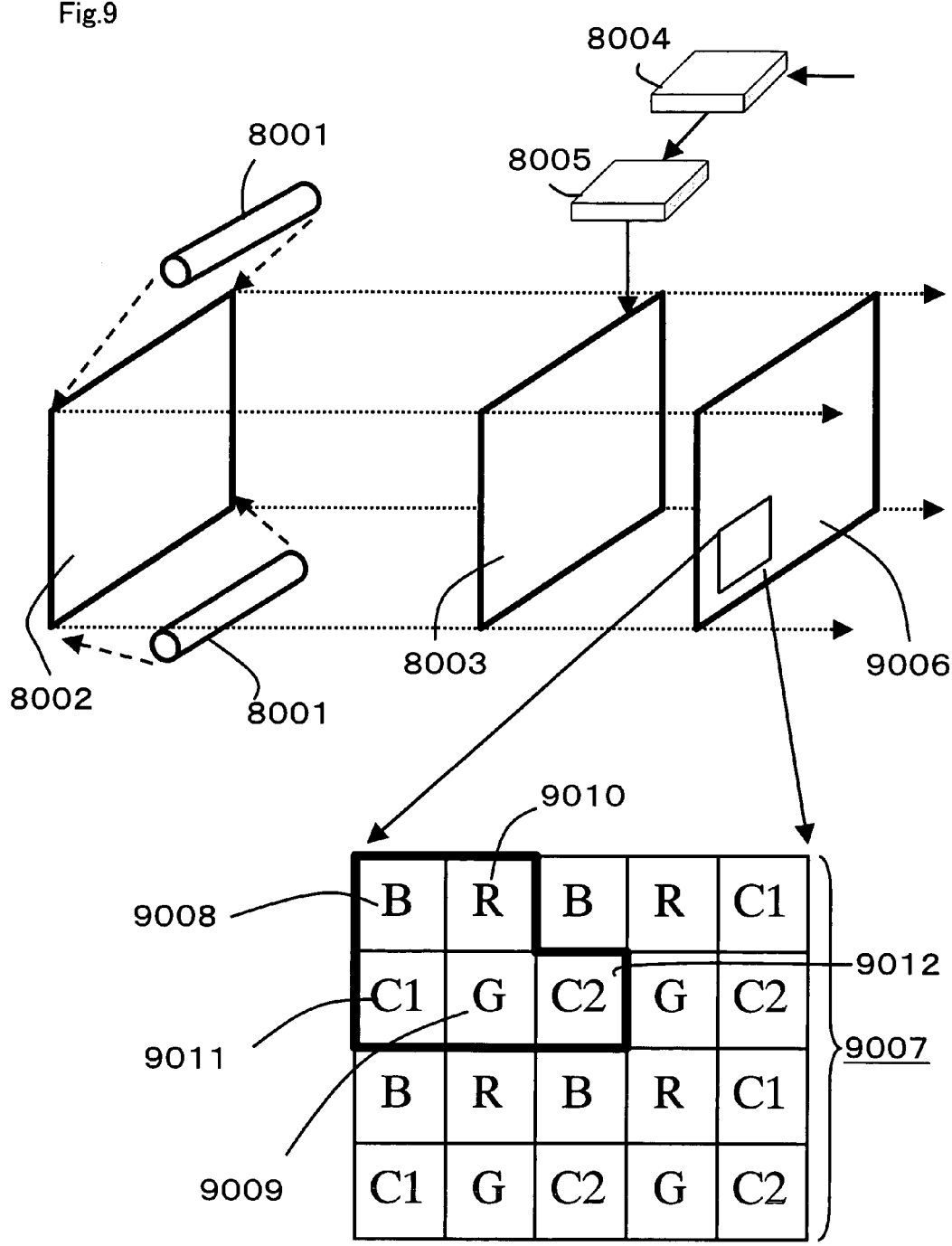
FIG. 9 is a configuration of a 5-primary color image display device in accordance with a third exemplary embodiment of the present invention.
Figure 10:
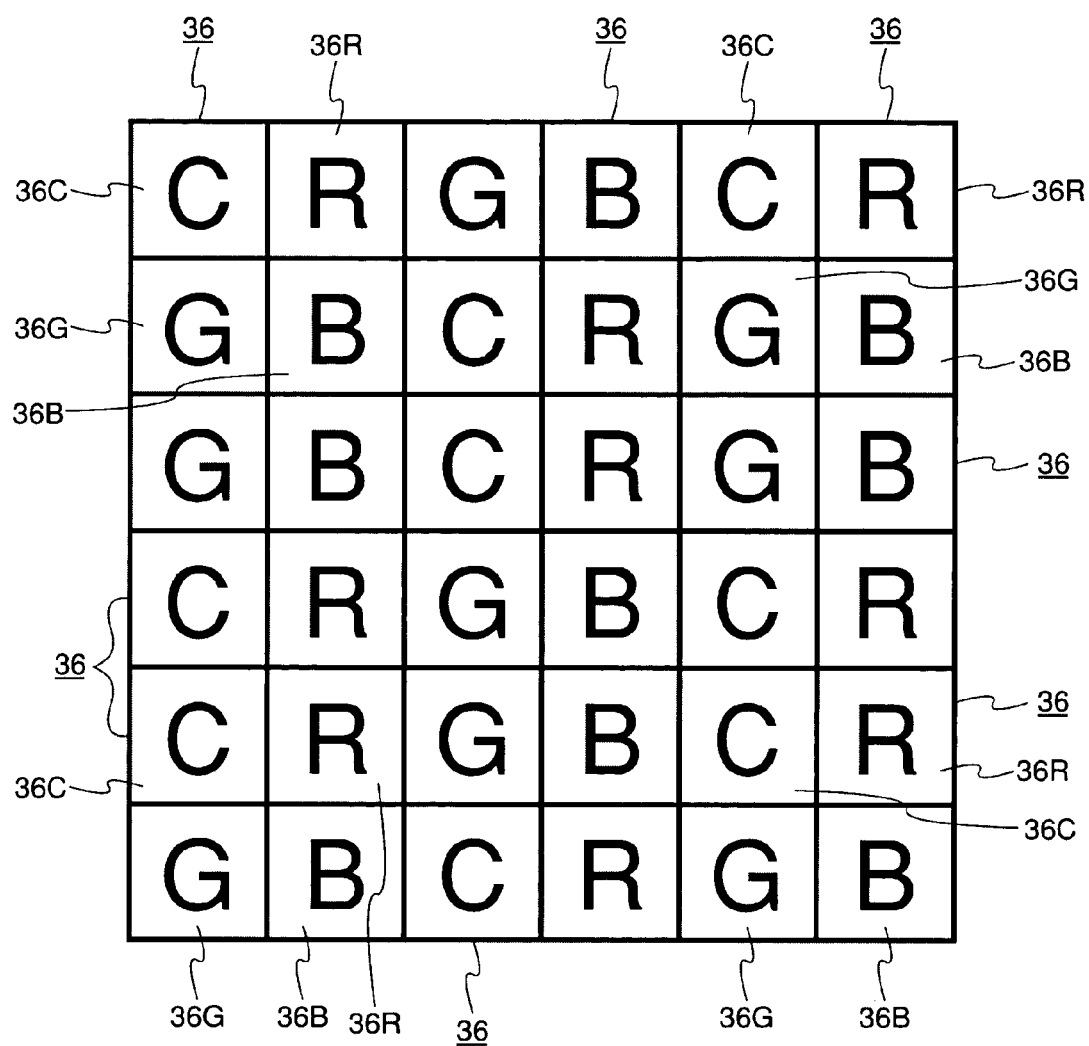
FIG. 10 is a pixel in a conventional image display device.
Figure 11:
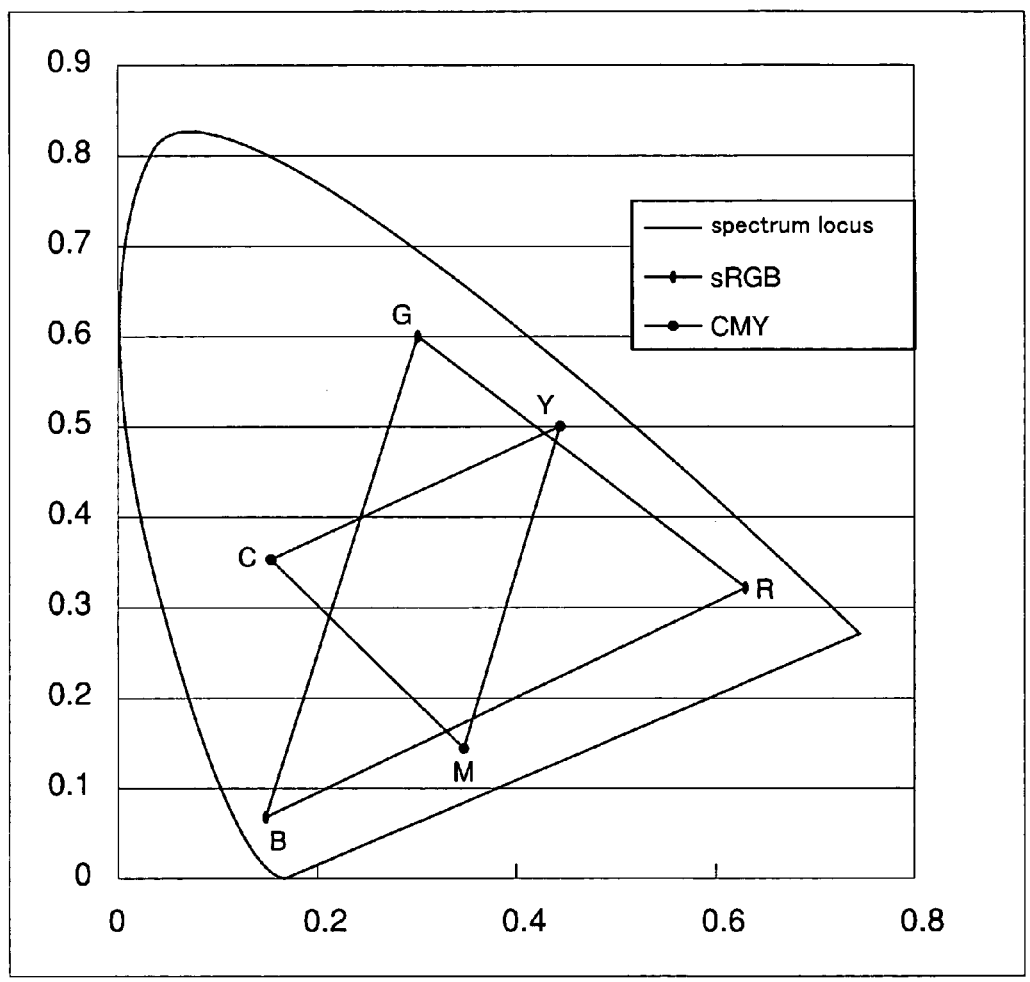
FIG. 11 is a chromaticity diagram for the conventional image display device.

FIG. 9 is the configuration of a liquid crystal display having five primary colors in a third exemplary embodiment of the present invention.

Color filter panel 9006 is different from the liquid crystal display of the second exemplary embodiment in FIG. 8.

Color filter 9007, which is a fragmentary magnified view of color filter panel 9006, consists of five color filters as one pixel: B-filter 9008, G-filter 9009, R-filter 9010, C1-filter 9011, and C2-filter 9012. As in the second exemplary embodiment, the spectral transmittance is designed such that lights passing B-filter 9008, G-filter 9009, and R-filter 9010 have chromaticity coordinates conforming to Rec. 709 for primary color B, primary color G, and primary color R. Primary color C1 and primary color C2 act in the same way as C-primary color 4004, and are arranged in regions given names such as blue, blue green, and green, contributing to broadening of the color gamut.

This configuration requires the development of only two new materials for primary color C1 and primary color C2 in the 5-primary color display, and achieves compatibility with the 3-primary color video signal same as in the first exemplary embodiment.

As described above, the liquid crystal display in the third exemplary embodiment also conforms the chromaticity coordinates for primary color R, primary color G, and primary color G to Rec. 709, as in the first exemplary embodiment, and identifies one-dimensional luminance Y. Accordingly, materials for the conventional RGB 3-primary color liquid crystal display can be used, and the driving circuit can use a simple scaling calculation for securing compatibility with 3-primary color video signals. A 5-primary color display with a broad color gamut mostly covering the color distribution of naturally reflective objects can thus be achieved.

It is noted that the present invention does not place restrictions on the spatial positions of the color filters. Positions for B-filter 9008, G-filter 9009, R-filter 9010, C1-filter 9011, and C2-filter 9012 in FIG. 9 are determined as required.

INDUSTRIAL APPLICABILITY

As described above, the present invention is effective for image display devices employing four or more primary colors. The present invention secures compatibility with conventional sRGB displays and is suitable for displaying in a precise fashion the colors of naturally reflective objects.

| Reference numerals in the drawings | |
|---|---|
| 36 | Pixel |
| 36R, 36G, 36B, 36C | Sub-pixel |
| 101 | Driving circuit |
| 102 | Image display device |
| 103 | Light source |
| 1001 | Light source |
| 1002 | Light from light source |
| 1003 | First dichroic mirror |
| 1004 | B-primary color light |
| 1005 | B-primary color spatial modulation element |
| 1006 | B-channel video light |
| 1007 | Light passing through first dichroic mirror 1003 |
| 1008 | Second dichroic mirror |
| 1009 | R-primary color light |
| 1010 | R-primary color spatial modulation element |
| 1011 | R-channel video light |
| 1012 | Light passing through second dichroic mirror 1008 |

-continued

| Reference numerals in the drawings | |
|---|---|
| 1013 | Third dichroic mirror |
| 1014 | G-primary color light |
| 1015 | G-primary color spatial modulation element |
| 1016 | G-channel video light |
| 1017 | Light passing through third dichroic mirror 1013 |
| 1018 | C-primary color spatial modulation element |
| 1019 | C-channel video light |
| 1020 | B-primary color adjustment filter |
| 1021 | R-primary color adjustment filter |
| 1022 | G-primary color adjustment filter |
| 1023 | C-primary color adjustment filter |
| 1024 | B-primary color ND filter |
| 1025 | R-primary color ND filter |
| 1026 | G-primary color ND filter |
| 1027 | C-primary color ND filter |
| 1030, 1031 | Reflective mirror |
| 1032, 1033, 1034 | Half mirror |
| 1035 | Video light mixer |
| 1036 | Primary color B generating unit |
| 1037 | Primary color R generating unit |
| 1038 | Primary color G generating unit |
| 1039 | Primary color C generating unit |
| 1040 | Screen |
| 2001 | Color gamut of sRGB display |
| 2002 | (Pointer + SOCS) color gamut |
| 2003 | Visible region |
| 3001 | Color gamut of 4-primary color display |
| 4001 | B-primary color |
| 4002 | G-primary color |
| 4003 | R-primary color |
| 4004 | C-primary color |
| 6001 | Video interface of 4-primary color display |
| 6002 | Processing circuit of 4-primary color display |
| 6003 | R-channel image signal |
| 6004 | G-channel image signal |
| 6005 | B-channel image signal |
| 6006 | C-channel image signal |
| 7001 | Matrix calculation circuit |
| 8001 | Light source |
| 8002 | Reflector |
| 8003 | Liquid crystal panel |
| 8004 | Video memory |
| 8005 | Liquid crystal panel driving circuit |
| 8006 | Color filter panel |
| 8007 | Magnified view of color filter panel 8006 |
| 8008 | B-filter |
| 8009 | G-filter |
| 8010 | R-filter |
| 8011 | C-filter |
| 9006 | Color filter panel |
| 9007 | Magnified view of color filter panel 9006 |
| 9008 | B-filter |
| 9009 | G-filter |
| 9010 | R-filter |
| 9011 | C1-filter |
| 9012 | C2-filter |

The invention claimed is:

1. An image display method employing lights of four or more primary colors, said method displaying an image by at least mixing:
   lights of three primary colors having xy chromaticity and luminance ratio of primary color R, primary color G, and primary color B same as those of an sRGB display; and
   light of a fourth primary color having xy chromaticity in a visible region on an xy chromaticity diagram but outside a triangular region formed by said primary color R, said primary color G, and said primary color B; and luminance lower than said primary color G.

2. The image display method as defined in claim 1, wherein xy chromaticity of said fourth primary color is located in said visible region between a half line extending from said primary color it to said primary color G and a half line extending from said primary color R and primary color B, but outside said triangular region.

3. The image display method as defined in claim 2, wherein xy chromaticity of said fourth primary color is (x, y)=(0.046, 0.535); and luminance normalized to 100 of said primary color R, said primary color G, said primary color B, and said fourth primary color are: 6.78 for luminance of said primary color B, 56.25 for luminance of said primary color G, 25.25 for luminance of said primary color R, and 11.72 for luminance of said fourth primary color.

4. The image display method as defined in claim 3, wherein said mixing is one of spatial additive mixture, superimposed additive mixture, and temporal additive mixture.

5. The image display method as defined in claim 2, wherein said mixing is one of spatial additive mixture, superimposed additive mixture, and temporal additive mixture.

6. An image display method employing lights of four or more primary colors, said method displaying an image by at least mixing:
   light of primary color B having xy chromaticity of (x, y)=(0.150, 0.060) and lowest luminance;
   light of primary color G having xy chromaticity of (x, y)=(0.300, 0.600) and highest luminance;
   light of primary color R having xy chromaticity of (x, y)=(0.640), 0.330) and luminance higher than said primary color B and lower than said primary color G; and
   light of a fourth primary color having xy chromaticity in a visible region on an xy chromaticity diagram but outside a triangular region formed by said primary color R, said primary color G, and said primary color B; and luminance lower than said primary color G.

7. The image display method as defined in claim 2, wherein xy chromaticity of said fourth primary color is located in said visible region between a half line extending from said primary color R to said primary color G and a half line extending from said primary color R and primary color B, but outside said triangular region.

8. The image display method as defined in claim 7, wherein said mixing is one of spatial additive mixture, superimposed additive mixture, and temporal additive mixture.

9. An image display device for generating four or more primary colors, said device comprising:
   a primary color R generating unit, primary color G generating unit, and primary color B generating unit for generating lights of three primary colors with xy chromaticity and luminance ratio or primary color R, primary color G, and primary color B same as those of an sRGB display;
   a fourth primary color generating unit for generating light of a fourth primary color having xy chromaticity in a visible region on an xy chromaticity diagram but outside a triangular region formed by said primary color R, said primary color G, and said primary color B; and luminance lower than said primary color G;
   a spatial modulation unit for each primary color, said spatial modulation unit modulating each primary color light from said primary color R generating unit, said primary color G generating unit, said primary color B generating unit, and said fourth primary color generating unit by an input video signal for each primary color; and a video light mixer for mixing each video light from said spatial modulation unit.

10. The image display device as defined in claim 9, wherein said fourth primary color generating unit generates light having xy chromaticity in said visible region between a half line extending from said primary color R to said primary color G and a half line extending from said primary color R to said primary color B, but outside said triangular region.

11. The image display device as defined in claim 10, wherein said light generated in said fourth primary color generating unit has xy chromaticity of (x, y)=(0.046, 0.535); and luminance normalized to 100 of lights generated in said primary color R generating unit, said primary color G generating unit, said primary color B generating unit, and said fourth primary color generating unit is: 6.78 for luminance of said primary color B, 56.25 for luminance of said primary color G, 25.25 for luminance of said primary color R, and 11.72 for luminance of said fourth primary color.

12. The image display device as defined in claim 11, wherein said video light mixer executes one of spatial additive mixture, superimposed additive mixture, and temporal additive mixture.

13. The image display device as defined in claim 12, wherein said generating unit for each primary color generates light of each primary color using a dichroic mirror to reflect a part of light from a light source spectrally and pass through remaining light.

14. The image display device as defined in claim 12, wherein said generating unit for each primary color generates light of each primary color using a filter to absorb a part of light from a light source spectrally and pass through remaining light.

15. The image display device as defined in claim 11, wherein said generating unit for each primary color generates light of each primary color using a dichroic mirror to reflect a part of light from a light source spectrally and pass through remaining light.

16. The image display device as defined in claim 11, wherein said generating unit for each primary color generates light of each primary color using a filter to absorb a part of light from a light source spectrally and pass through remaining light.

17. The image display device as defined in claim 11 further comprising a scaling circuit for scaling three-primary color video signals for an sRGB display, said scaling circuit outputting a signal to said spatial modulation unit when no video signal for said fourth primary color is input.

18. The image display device as defined in claim 10, wherein said video light mixer executes one of spatial additive mixture, superimposed additive mixture, and temporal additive mixture.

19. The image display device as defined in claim 18, wherein said generating unit for each primary color generates light of each primary color using a dichroic mirror to reflect a part of light from a light source spectrally and pass through remaining light.

20. The image display device as defined in claim 18, wherein said generating unit for each primary color generates light of each primary color using a filter to absorb a part of light from a light source spectrally and pass through remaining light.

21. The image display device as defined in claim 10, wherein said generating unit for each primary color generates light of each primary color using a dichroic mirror to reflect a part of light from a light source spectrally and pass through remaining light.

22. The image display device as defined in claim 10, wherein said generating unit for each primary color generates light of each primary color using a filter to absorb a part of light from a light source spectrally and pass through remaining light.

23. The image display device as defined in claim 10 further comprising a scaling circuit for scaling three-primary color video signals for an sRGB display, said scaling circuit outputting a signal to said spatial modulation unit when no video signal for said fourth primary color is input.

24. The image display device as defined claim 9, wherein said generating unit for each primary color generates light of each primary color using a dichroic mirror to reflect a part of light from a light source spectrally and pass through remaining light.

25. The image display device as defined in claim 9, wherein said generating unit for each primary color generates light of each primary color using a filter to absorb a part of light from a light source spectrally and pass through remaining light.

26. The image display device as defined in claim 9, further comprising a scaling circuit for scaling three-primary color video signals for an sRGB display, said sealing circuit outputting a signal to said spatial modulation unit when no video signal for said fourth primary color is input.

27. An image display device for generating at least four primary colors, said device comprising:
- a primary color B generating unit for generating light of primary color B having xy chromaticity of (x, y)= (0.150, 0.060) and lowest luminance;
- a primary color G generating unit for generating light of primary color G having xy chromaticity of (x, y)= (0.300, 0.600) and highest luminance;
- a primary color R generating unit for generating light of primary color R having xy chromaticity of(x, y)= (0.640, 0.330) and luminance higher than said primary color B and lower than said primary color G;
- a fourth primary color generating unit for generating light of a fourth primary color having xy chromaticity in a visible region on an xy chromaticity diagram but outside a triangular region formed by said primary color R, said primary color G, and said primary color B; and luminance lower than said primary color G;
- a spatial modulation unit for each primary color, said spatial modulation unit modulating each primary color light from said primary color R generating unit, said primary color G generating unit, said primary color B generating unit, and said fourth primary color generating unit by an input video signal for each primary color; and
- a video light mixer for mixing each video light from said spatial modulation unit.

28. The image display device as defined in claim 27, wherein said fourth primary color generating unit generates light having xy chromaticity in said visible region between a half line extending from said primary color R to said primary color G and a half line extending from said primary color R to said primary color B, but outside said triangular region.

29. The image display device as defined in claim 28, wherein said light generated in said fourth primary color generating unit has xy chromaticity of (x, y)=0.046, 0.535); and luminance normalized to 100 of lights generated in said primary color R generating unit, said primary color G generating unit, said primary color B generating unit, and said fourth primary color generating unit is: 6.78 for luminance of said primary color B, 56.25 for luminance of said primary color G, 25.25 for luminance of said primary color R, and 11.72 for luminance of said fourth primary color.

30. The image display device as defined in claim 29, wherein said video light mixer executes one of spatial additive mixture, superimposed additive mixture, and temporal additive mixture.

31. The image display device as defined in claim 30, wherein said generating unit for each primary color generates light of each primary color using a dichroic mirror to reflect a part of light from a light source spectrally and pass through remaining light.

32. The image display device as defined in claim 30, wherein said generating unit for each primary color generates light of each primary color using a filter to absorb a port of light from a light source spectrally and pass through remaining light.

33. The image display device as defined in claim 29, wherein said generating unit for each primary color generates light of each primary color using a dichroic mirror to reflect a part of light from a light source spectrally and pass through remaining light.

34. The image display device as defined in claim 29, wherein said generating unit for each primary color generates light of each primary color using a filter to absorb a part of light from a light source spectrally and pass through remaining light.

35. The image display device as defined in claim 29 further comprising a scaling circuit far scaling three-primary color video signals for an sRGB display, said scaling circuit outputting a signal to said spatial modulation unit when no video signal for said fourth primary color is input.

36. The image display device as defined in claim 28, wherein said video light mixer executes one of spatial additive mixture, superimposed additive mixture, and temporal additive mixture.

37. The image display device as defined in claim 36, wherein said generating unit for each primary color generates light of each primary color using a dichroic mirror to reflect a part of light from a light source spectrally and pass through remaining light.

38. The image display device as defined in claim 36, wherein said generating unit for each primary color generates light of each primary color using a filter to absorb a part of light from a light source spectrally and pass through remaining light.

39. The image display device as defined in claim 28, wherein said generating unit for each primary color generates light of each primary color using a dichroic mirror to reflect a part of light from a light source spectrally and pass through remaining light.

40. The image display device as defined in claim 28, wherein said generating unit for each primary color generates light of each primary color using a filter to absorb a part of light from a light source spectrally and pass through remaining light.

41. The image display device as defined in claim 28 further comprising a scaling circuit for scaling three-primary color video signals for an sRGB display, said scaling circuit outputting a signal to said spatial modulation unit when no video signal for said fourth primary, color is input.

42. The image display device as defined in claim 27, wherein said generating unit for each primary color generates light of each primary color using a dichroic mirror to reflect a part of light from a light source spectrally and pass through remaining light.

43. The image display device as defined in claim 27, wherein said generating unit for each primary color generates light of each primary color using a filter to absorb a part of light from a light source spectrally and pass through remaining light.

44. The image display device as defined in claim 27 further comprising a scaling circuit for scaling three-primary color video signals for an sRGB display, said scaling circuit outputting a signal to said spatial modulation unit when no video signal for said fourth primary color is input.

* * * * *

UNITED STATES PATENT AND TRADEMARK OFFICE
CERTIFICATE OF CORRECTION

PATENT NO. : 7,129,955 B2
APPLICATION NO. : 10/474462
DATED : October 31, 2006
INVENTOR(S) : Hideto Motomura et al.

It is certified that error appears in the above-identified patent and that said Letters Patent is hereby corrected as shown below:

<u>Title Page, Item (56) References Cited, OTHER PUBLICATIONS</u>
Change "Hakutestu Ko" to -- Hakutetsu Ko --

<u>Claim 2 Column 18</u>
Line 1, change "it" to -- R --

<u>Claim 3 Column 18</u>
Line 4, change "2" to -- 6 --

<u>Claim 6 Column 18</u>
Line 36, change "2" to -- 6 --

<u>Claim 9 Column 18</u>
Line 51, change "or" to -- of --

<u>Claim 26 Column 20</u>
Line 23, change "sealing" to -- scaling --

<u>Claim 32 Column 21</u>
Line 14, change "port" to -- part --

<u>Claim 35 Column 21</u>
Line 28, change "far" to -- for --

<u>Claim 41 Column 22</u>
Line 20, change "primary," to -- primary --

Signed and Sealed this

Twentieth Day of March, 2007

JON W. DUDAS
*Director of the United States Patent and Trademark Office*